United States Patent [19]
Schubert

[11] 3,739,660
[45] June 19, 1973

[54] SPINDLE CARRIER LOCKING AND CLAMPING MECHANISM IN MULTIPLE SPINDLE MACHINE TOOL

[75] Inventor: Karl P. Schubert, Mayfield Heights, Ohio

[73] Assignee: Acme-Cleveland Corporation, Cleveland, Ohio

[22] Filed: Sept. 15, 1971

[21] Appl. No.: 180,698

[52] U.S. Cl. ............... 74/815, 74/813 L, 74/825
[51] Int. Cl. ............................................ B23b 29/32
[58] Field of Search .............. 74/813, 813 L, 815, 74/817, 821, 822, 824, 825

[56] References Cited
UNITED STATES PATENTS 2,633,777  4/1953  Hoern ........................ 74/813 UX
2,956,452  10/1960  Dever ........................ 74/815 X Primary Examiner—Charles J. Myhre
Assistant Examiner—F. D. Shoemaker
Attorney—Woodling, Krost, Granger & Rust

[57] ABSTRACT

In a a multiple-spindle machine tool, a cam-operated locking pin assembly which, at the end of an indexing rotation of the spindle carrier, turns the spindle carrier a slight additional amount in the same rotational direction against a locating pin assembly and then clamps the spindle carrier in this position. The foregoing abstract is merely a resume of one general application, is not a complete discussion of all principles of operation or applications, and is not to be construed as a limitation on the scope of the claimed subject matter.

7 Claims, 5 Drawing Figures

INVENTOR.
KARL P. SCHUBERT

INVENTOR.
KARL P. SCHUBERT
BY Woodling, Krost,
Granger and Rust
ATTORNEYS

SPINDLE CARRIER LOCKING AND CLAMPING MECHANISM IN MULTIPLE SPINDLE MACHINE TOOL

BACKGROUND OF THE INVENTION

This invention relates to a mechanism for locking and clamping the spindle carrier in a multiple-spindle machine tool. Various multiple-spindle machine tools commonly have a spindle carrier which is rotatively indexed intermittently through fractional turns so as to position each spindle on the carrier at successive work stations where different machining operations are performed on each spindle-held workpiece. In such machine tools the spindle carrier must be properly located at each successive angular rotational position and it must be clamped in place while the machining operations are taking place on the spindle-held workpieces.

Various arrangements have been provided heretofore for locating, stopping and clamping the spindle carrier at each position to which it is rotatively indexed. However, the prior arrangements for this purpose have not been entirely satisfactory, particularly from the standpoints of complexity and smoothness of operation.

The present invention is directed to a novel mechanism which overcomes the difficulties and disadvantages associated with these prior arrangements by providing for the final rotative positioning and clamping of the spindle carrier in a novel and highly effective manner.

It is a principal object of this invention to provide a novel and improved stopping and clamping mechanism for the spindle carrier in a multiple-spindle machine tool.

Another object of this invention is to provide such a mechanism which, after a rotational indexing of the spindle carrier, automatically turns the spindle carrier in the same direction through the final increment to its final position and then clamps it in this position.

Another object of this invention is to provide a novel and improved stopping and clamping mechanism for the spindle carrier in a multiple-spindle machine tool in which a movable lever effects movement of a locking member into engagement with the spindle carrier, and after such engagement the lever overtravels to cause the locking member to first turn the spindle carrier to its final position and then clamp the spindle carrier in this position.

Another object of this invention is to provide such a mechanism in which the overtravel of the lever produces a progressively increasing spring-applied force on the locking member.

SUMMARY OF THE INVENTION

The invention may be incorporated in a multiple-spindle machine tool having a rotatable spindle carrier which is indexed in one rotational direction to different successive angular rotational positions, and a locating pin assembly at one circumferential location around the spindle carrier for engagement by the spindle carrier to precisely locate the latter's rotational position, the improvement which comprises a locking pin assembly at a different circumferential position around the spindle carrier having means operative at the end of an indexing rotation of the spindle carrier to engage the spindle carrier and force it in the same rotational direction against the locating pin assembly.

Other objects and a fuller understanding of the invention may be had by referring to the following description and claims, taken in conjunction with the accompanying drawing.

BRIEF DESCRIPTION OF THE DRAWING

in FIG. 1; and, FIG. 5 is a fragmentary perspective view showing the locking lever and associated parts in the locking mechanism.

DESCRIPTION OF THE PREFERRED EMBODIMENT

Figure 1:
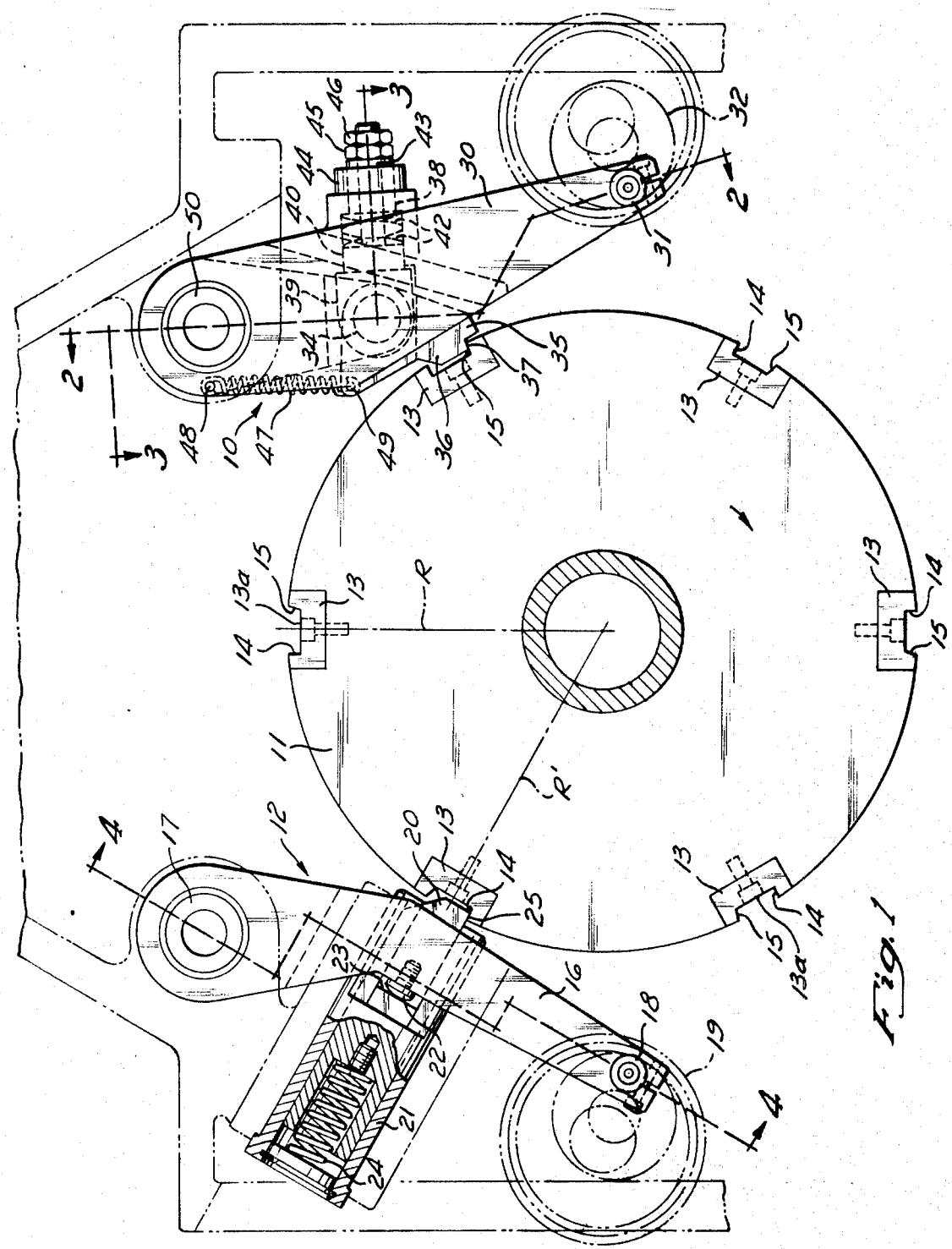
FIG. 1 is an elevational view, with parts broken away for clarity, showing the locating pin assembly and the locking mechanism of the present invention operatively associated with the indexing plate on the spindle carrier in a multiple-spindle machine tool.

In general outline, as shown in FIG. 1, the present invention comprises a locking pin assembly 10 operatively associated with a spindle carrier indexing plate 11 and a locating pin assembly 12 in a multiple-spindle machine tool.

The indexing plate 11 is on the spindle carrier in a multiple-spindle machine tool. As is conventional in multiple-spindle machine tools, the spindle carrier supports a plurality of rotatable spindles which hold a workpiece in different stages of machining and are evenly spaced apart circumferentially around the rotational axis of the spindle carrier. The spindle carrier is rotatively indexed successively through fractional turns to position each spindle at successive work stations where different machining operations are performed.

In the particular embodiment illustrated, the spindle carrier holds six spindles and it has six index positions. Consequently, as shown in FIG. 1, the indexing plate 11 has six pin blocks 13 located at 60° intervals around its circular periphery. When the spindle carrier is indexed, the indexing plate 11 turns clockwise in FIG. 1 through one-sixth of a turn to move the pin block 13 which was formerly at the 12 o'clock position down to the 2 o'clock position.

Each pin block 13 is of known design and has a relatively shallow recess 13a which is open at the periphery of the indexing plate 11 on the spindle carrier. At one circumferential end of this recess the pin block presents a flat shoulder 14 which extends parallel to, and offset in a counterclockwise direction from, a radius R of the indexing plate passing through the center of the recess 13a in this pin block. At the opposite circumferential end of this recess, the pin block presents an inclined locking shoulder 15 which extends at an angle of 15° to this radius.

It is, of course, necessary to precisely locate the spindle carrier at the correct angular rotational position each time it is indexed, so that all of the workpieces will be properly positioned by the respective spindles with respect to the cutting tools. In the particular embodiment shown in the drawings, this locating function is performed by the locating pin assembly 12, which is positioned at the 10 o'clock position of the indexing plate 11 in FIG. 1.

This locating pin assembly 12 comprises a lever 16 whose upper end is pivoted on a horizontal, fixed shaft 17 in the machine tool. At its lower end, the lever 16 carries a cam follower in the form of a roller 18 which engages the cam track on a rotary cam 19.

Approximately midway between the upper and lower ends of lever 16, a locating pin 20 is slidably supported by a fixed holder 21 for movement radially of the indexing plate 11 on the spindle carrier. The lever 16 is coupled to this locating pin through a bolt 22 on the back side of the lever having its rounded head in sliding engagement with a transverse shoulder 23 on the locating pin 20. A compression spring 24 carried by the holder 21 urges the locating pin 20 radially inward toward the indexing plate 11. The locating pin 20 presents a flat shoulder 25 extending parallel to, and offset counterclockwise from, a radius R' of the indexing plate 11 passing through the 10 o'clock position. This shoulder 25 on the locating pin is to be engaged by the corresponding shoulder 14 on the corresponding pin block 13 on the indexing plate, as shown in FIG. 1, to define the correct indexing (i.e., angular rotational) position of the spindle carrier.

Normally, the spring 24 biases the locating pin 20 radially inwardly for reception in the recess 13a of the correspondingly positioned pin block 13 on the indexing plate 11. However, when the spindle carrier is to be indexed, the cam 19 moves the lever 16 clockwise in FIG. 1, retracting the locating pin 20 out of this pin block recess 13a and beyond the periphery of the indexing plate 11, which now is rotated 60° until the next pin block recess 13a is at about the 10 o'clock rotational position. At this time the cam 19 releases the lever 16 to permit radially inward movement of the locating pin 20 under the influence of spring 24. Consequently, the locating pin moves into the recess 13a in the pin block 13 which has just been moved to the 10 o'clock position.

The locking and clamping of the spindle carrier is effected through the locking pin assembly 10, now to be described.

This assembly comprises a lever 30 having its upper end pivoted on a fixed horizontal shaft 50 in the machine tool. At its lower end this lever carries a cam follower in the form of a roller 31 which engages the cam track on a rotary cam 32.

Figure 2:
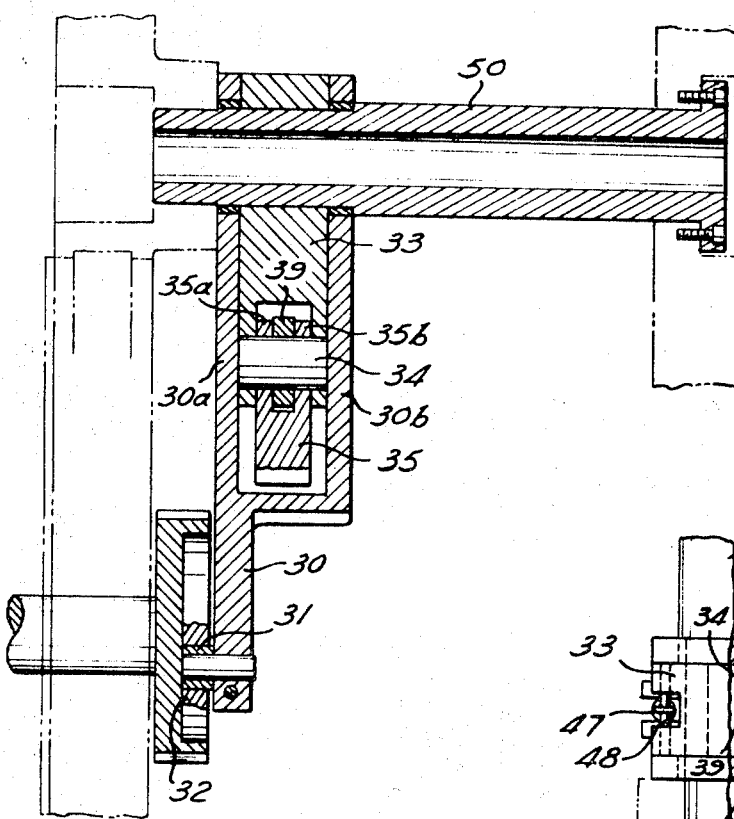
FIG. 2 is a section taken along the line 2—2 through the locking mechanism in FIG. 1.

As shown in FIG. 2, the lever 30 is bifurcated at its upper end, presenting spaced, parallel, upstanding legs 30a and 30b. A hanger plate 33 extends down between these legs 30a and 30b of lever 30. Hanger plate 33 is pivoted on shaft 50 independent of lever 30, so that either can be turned with respect to the other. Toward its lower end the hanger plate 33 is bifurcated and at this location it carries a horizontal cross pin 34.

A locking lever 35 (FIG. 5) is rotatably mounted on this cross pin 34. This locking lever presents a tooth 36 projecting inward toward the indexing plate 11 for engagement in a pin block recess 13a on the latter. The lower end of this tooth presents a flat surface 37 having the same 15° inclination as the corresponding shoulder 15 at the clockwise end of this pin block recess 13a when located at the 2 o'clock rotational position.

Figure 3:
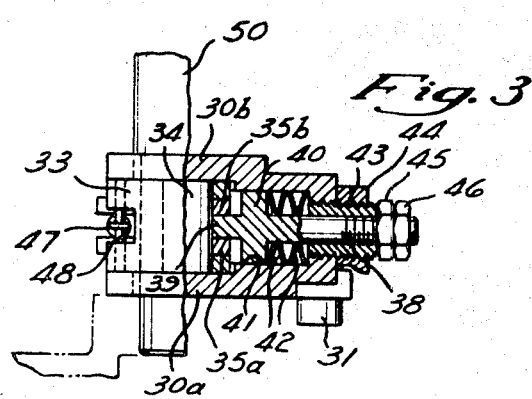
FIG. 3 is a section taken along the line 3—3 through the locking mechanism in FIG. 1.
Figure 4:
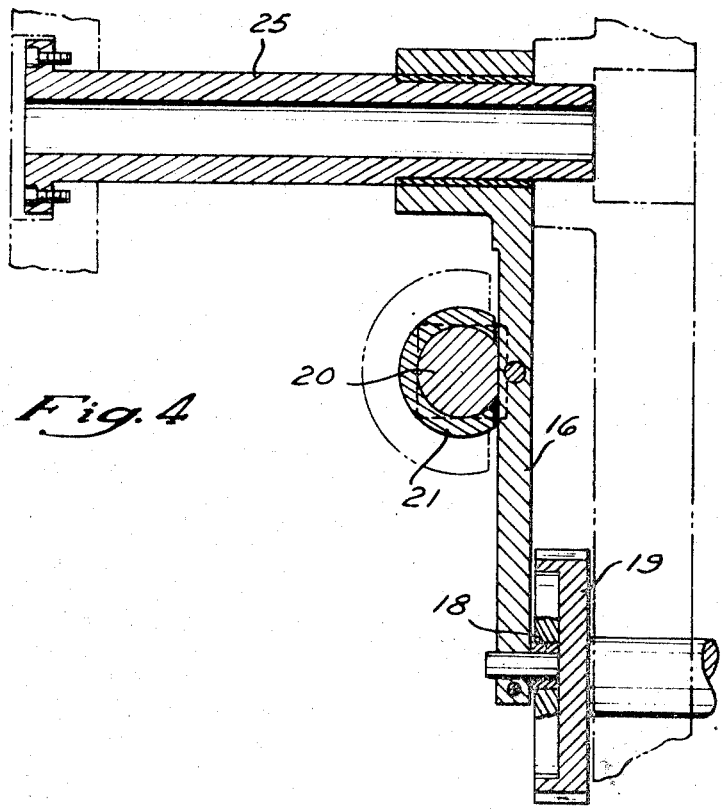
FIG. 4 is a section taken along the line 4—4 through the locating pin assembly.
Figure 5:
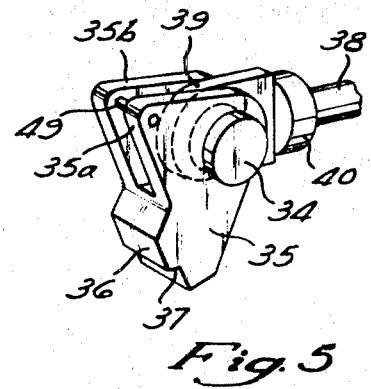

Above this tooth 36 the locking lever 35 is bifurcated as best seen in FIG. 5, presenting opposite, parallel, upwardly extending legs 35a and 35b. An actuating rod 38 has a generally D-shaped, flattened segment 39 at its front end which is disposed between these legs 35a and 35b on the locking lever 35 and is snugly, but rotatably, mounted on the cross pin 34. Immediately behind this front end segment 39 the actuating rod 38 has an enlarged circular segment 40, which is slidably received in a bore 41 (FIG. 3) formed in lever 30. Belleville springs 42 are engaged between lever 30 (at the back end of this bore) and segment 40 on actuating rod 38 to urge the actuating rod to the left in FIGS. 1, 3 and 5. Lever 30 carries an externally threaded sleeve 43 which slidably receives the actuating rod 38. A nut 44 is threaded onto sleeve 43 in back of lever 30. A stop nut 45 is threadedly mounted on the back end of actuating rod 38 for engagement with the back end of sleeve 43 to limit the movement of rod 38 to the left in FIGS. 1, 3 and 5. Another nut 46 locks the nut 45 in place on the actuating rod.

A coil spring 47 (FIG. 1) is under tension between a cross pin 48 carried by hanger plate 33 and a cross pin 49 on locking lever 35. This spring biases the locking lever 35 clockwise in FIG. 1 to maintain its tooth 36 projecting toward engagement with the indexing plate 11 at the latter's periphery.

OPERATION

Both cams 19 and 32 are driven intermittently from the main drum shaft in the machine tool in timed relationship with the indexing of the spindle carrier 60° from one rotational position to the next after each machining operation.

When a machining operation is finished and the spindle carrier is ready to be indexed, the cam 19 is rotated to rock the lever 16 in the locating pin assembly 12 clockwise in FIG. 1, thereby disengaging the locating pin 20 from the pin block 13 on the indexing plate 11 at the 10 o'clock rotational position. Also, at this time the cam 32 is rotated to rock the lever 30 in the locking pin assembly 10 counterclockwise in FIG. 1, thereby disengaging the tooth 36 on the locking lever 35 from the indexing plate. Next, the spindle carrier is turned and the indexing plate 11 turns with it (clockwise in FIG. 1) to move the pin block 13 which was formerly at the 8 o'clock rotational position up to the 10 o'clock position, and to move the pin block 13 which was formerly at the 12 o'clock position down to the 2 o'clock position. The indexing drive for the spindle carrier stops after it has been turned about 60°, and final positioning of the spindle carrier is effected by the locating pin assembly 12 and the locking pin assembly 10 in the manner now to be described.

As the indexing plate 11 approaches the completion of its 60° clockwise indexing rotation, the cam 19 releases lever 16 to permit spring 24 to force the locating pin 20 radially inward. The locating pin moves into the recess 13a in the block 13 on the indexing plate 11 which is now at the 10 o'clock position. The spindle carrier is not quite at its final index position and initially there may be a slight clearance between the shoulder 25 on the locating pin 20 and the corresponding shoulder 14 on this pin block 13.

Now, the cam 32 moves the stop pin assembly lever 30 clockwise in FIG. 1 to move the tooth 36 on the locking lever 35 into groove 13a on the pin block 13 which is now at the two o'clock rotational position of the indexing plate 11. Until the locking lever 35 encounters substantial resistance to such movement, the Belleville springs 42 and actuating rod 43 provide a stiff coupling between lever 30 and the locking lever 35, imparting the movement of lever 30 to the locking lever 35.

When the tooth 36 on the locking lever 35 first engages the inclined face 15 on the pin block 13 which is now at the 2 o'clock rotational position, the inertia load of the spindle carrier tends to oppose the continued inward movement of the locking lever 35, which is coupled to the lever 30 through the Belleville springs 42, actuator rod 38, and cross shaft 34. The cam 32 continues to rotate and continues to force the lever 30 clockwise in FIG. 1. This continued movement of lever 30 tends to continue forcing the cross shaft 34 inward (to the left in FIG. 1) toward the indexing plate, and it is accommodated first by the counterclockwise rocking of the locking lever 35 on cross shaft 34. This rocking of the locking lever causes it to turn the indexing plate 11 clockwise in FIG. 1 until the shoulder 14 on the pin block 13 at the 10 o'clock position has engaged the shoulder 25 on the locating pin 20.

Further rotation of the indexing plate 11 cannot now take place, but the cam 32 continues to rock the lever 30 clockwise in FIG. 1. This continued movement of lever 30 now is accommodated by further compressing the Belleville springs 42 in the coupling between lever 30 and locking lever 35. These springs now apply a heavy clamping force through the actuator rod 38, cross shaft 34 and locking lever 35 against the indexing plate 11, urging the latter clockwise into tight engagement with the locating pin 20. The hanger plate 33 and locking lever 35, pivoted together at the cross shaft 34 form a toggle mechanism. The force of the Belleville springs 42 acts on the knee 34 of this toggle to straighten it as the spindle carrier is slightly rotated into its precisely located position. The straightening of the toggle exerts a very large force 10 to securely clamp the spindle carrier in position despite large machining loads thereon.

From the foregoing it will be evident that the novel locking pin assembly in the present invention provides for the prompt engagement of the locking lever 35 with the indexing plate 11 on the spindle carrier when the lever 30 is first moved inward by the cam 32. Until such engagement occurs, the locking lever 35 moves in unison with the lever 30. However, once the locking lever engages and encounters an appreciable load, the just-described coupling between the lever 30 and the locking lever 35 provides for overtravel movement of lever 30 with respect to locking lever 35 and finally, a progressively increasing force on the locking lever as a result of the continuing overtravel movement of lever 30. Consequently, the indexing plate 11 is brought quickly to its final index position (as determined by its engagement against the shoulder 25 on the locating pin 20) and then is clamped against this shoulder with gradually increasing force (due to the progressive compression of the spring 42) in such a manner as to avoid damage to the engaging surfaces on the locating pin assembly 12, the indexing plate 11, and the locking pin assembly 10, and to provide a very effective clamping action when the indexing plate has reached its final index position. Throughout this stopping and clamping sequence the movement of the spindle carrier and the force exerted on it by the locking pin assembly are always in one direction, which contributes to the smoothness and quickness of the stopping and clamping operation.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a multiple-spindle machine tool having a rotatable spindle carrier which is indexed in one rotational direction to different successive angular rotational positions, and a locating pin assembly at one circumferential aperture location around the spindle carrier for engagement by the spindle carrier to precisely locate the latter's rotational position, the improvement which comprises:

a locking pin assembly at a different circumferential position aperture around the spindle carrier having means operative at the end of an indexing rotation of the spindle carrier to engage the spindle carrier and force it in the same rotational direction against the locating pin assembly.

2. The combination of claim 1, wherein said locking pin assembly comprises:

a locking member for engagement with the spindle carrier, and means operable at the end of an indexing rotation of the spindle carrier to move said locking member into engagement with the spindle carrier, said last-mentioned means being operable after such engagement to overtravel with respect to said locking member to cause the locking member to turn the spindle carrier into engagement with said locating pin assembly and thereafter to clamp the spindle carrier against said locating pin assembly.

3. The combination of claim 2 wherein said last-mentioned means includes spring means acting on said locking member and arranged to exert a progressively increasing force on the locking member as said overtravel takes place.

4. The combination of claim 1 wherein said locking pin assembly comprises:

a lever, a locking lever for engagement with the spindle carrier, a coupling including spring means acting between said first-mentioned lever and said locking lever for normally imparting the movement of said first-mentioned lever to the locking lever;

and means for pivoting said first-mentioned lever in one direction at the end of an indexing rotation of the spindle carrier to move said locking lever into engagement with the spindle carrier and for continuing the rocking of said first-mentioned lever in the same direction beyond where such engagement first occurs to progressively compress said spring means and thereby cause said locking lever to clamp the spindle carrier against said locating pin assembly.

5. The combination of claim 1, wherein said locking pin assembly comprises:

a lever pivoted at one end and having a cam follower at its opposite end;

a hanger plate separately pivoted on the same pivot as said lever, a cross pin carried by said hanger plate at a location thereon spaced from said pivot toward said cam follower, an actuator member engaging said cross pin, spring means acting between said lever and said actuator member to normally impart the movement of said lever to said cross pin;

a locking lever pivoted on said cross pin and projecting there from toward the spindle carrier, and cam means engaging said cam follower and operable at the end of an indexing rotation of the spindle carrier to move said first-mentioned lever in a direction to move said locking lever into engagement with the spindle carrier and thereafter to cause said first-mentioned lever to overtravel in the same direction to rock said locking lever on said cross pin so as to force the spindle carrier against the locating pin assembly, and thereafter to progressively compress said spring means to increase the force clamping the spindle carrier against the locating pin assembly.

6. In a multiple-spindle machine tool having a rotatable spindle carrier which is indexed in one rotational direction to different successive angular rotational positions, and a locating pin assembly at one circumferential location around the spindle carrier for engagement by the spindle carrier to precisely locate the latter's angular rotational position, the improvement which comprises a locking pin assembly at a different circumferential location around the spindle carrier and including:

a lever, a locking lever for engagement with the spindle carrier, coupling means acting between said first-mentioned lever and said locking lever to normally impart the movement of said first-mentioned lever to the locking lever and providing overtravel of said first-mentioned lever with respect to the locking lever after the locking lever engages the spindle carrier;

and means operative at the end of an indexing rotation of the spindle carrier to move said first-mentioned lever in a direction to bring said locking lever into engagement with the spindle carrier and thereafter to cause said first-mentioned lever to overtravel in the same direction, said coupling means acting on said locking lever during said overtravel of said first-mentioned lever, first, to rotate the spindle carrier against said locating pin assembly, and thereafter, to clamp the spindle carrier against the locating pin assembly.

7. The combination of claim 6 wherein said coupling means includes spring means acting on the locking lever, and means operable upon said overtravel of said first-mentioned lever to progressively compress said spring means to exert an increasing force on said locking lever.

* * * * *